(12) United States Patent
Suwald

(10) Patent No.: US 11,601,274 B2
(45) Date of Patent: Mar. 7, 2023

(54) ENROLLMENT DEVICE AND METHOD OF FACILITATING ENROLLMENT OF A BIOMETRIC TEMPLATE

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 78 days.

(21) Appl. No.: 16/922,610

(22) Filed: Jul. 7, 2020

(65) Prior Publication Data
US 2021/0028938 A1    Jan. 28, 2021

(30) Foreign Application Priority Data

Jul. 22, 2019   (EP) .................................... 19187534

(51) Int. Cl.
*H04L 9/32* (2006.01)
*G08B 5/38* (2006.01)
*G06V 40/50* (2022.01)
*G06V 40/12* (2022.01)

(52) U.S. Cl.
CPC ........ *H04L 9/3213* (2013.01); *G06V 40/1365* (2022.01); *G06V 40/50* (2022.01); *G08B 5/38* (2013.01); *H04L 9/3231* (2013.01)

(58) Field of Classification Search
CPC . H04L 9/3213; H04L 9/3231; G06V 40/1365; G06V 40/50; G06V 40/13; G06V 40/1335; G08B 5/38; G06F 21/32; G06F 21/34

See application file for complete search history.

(56) References Cited

U.S. PATENT DOCUMENTS

| 9,928,401 B2 | 3/2018 | Clausen |
| 2002/0088861 A1* | 7/2002 | Durbin ............... G06K 7/10722 235/472.01 |
| 2002/0146197 A1* | 10/2002 | Yong .................... G02B 6/3566 385/17 |

(Continued)

FOREIGN PATENT DOCUMENTS

| EP | 3284394 A1 | 2/2018 |
| EP | 3382599 A2 | 10/2018 |
| EP | 3537337 A1 | 9/2019 |

OTHER PUBLICATIONS

U.S. Appl. No. 16/791,286; Inventor, Thomas Suwald et al.; "Method for Enabling a Biometric Template;"; Filed Feb. 14, 2020.

(Continued)

*Primary Examiner* — Sanchit K Sarker

(57) ABSTRACT

In accordance with a first aspect of the present disclosure, an enrollment device is provided, comprising: a token interface unit configured to couple the enrollment device to an external user authentication token; a user interface unit configured to provide visual information to a user through a plurality of optical output elements, said visual information being indicative of a progress of a biometric template enrollment in the authentication token; a user interface control unit configured to receive input data indicative of said progress from the authentication token through the token interface unit and to control the user interface unit using said input data.

19 Claims, 14 Drawing Sheets

(56) References Cited

U.S. PATENT DOCUMENTS

| | | | | |
|---|---|---|---|---|
| 2010/0052852 | A1* | 3/2010 | Mohanty | G07C 9/257 |
| | | | | 380/243 |
| 2011/0277361 | A1 | 11/2011 | Nichol et al. | |
| 2013/0287211 | A1* | 10/2013 | Rhelimi | G07C 9/21 |
| | | | | 380/270 |
| 2017/0078368 | A1* | 3/2017 | Koullias | H04L 67/535 |
| 2017/0300680 | A1 | 10/2017 | Wendling | |
| 2018/0276518 | A1* | 9/2018 | Benkley, III | G06F 21/45 |
| 2019/0050618 | A1* | 2/2019 | Khuri-Yakub | A61B 5/14552 |
| 2019/0179438 | A1 | 6/2019 | Benkley, III et al. | |
| 2019/0272363 | A1* | 9/2019 | Suwald | G06F 21/33 |
| 2020/0186522 | A1* | 6/2020 | Apturkar | H04L 9/3231 |
| 2020/0387589 | A1* | 12/2020 | Gehrmann | G06F 21/32 |

OTHER PUBLICATIONS

Twitter.com; Twitter @jonteviggo; 2019.
ISO/IEC 19784-1:2006, First Edition May 1, 2006; "Information Technology—Biometric Application Programming Interface—Part 1: BioAPI Specification".

* cited by examiner

ENROLLMENT DEVICE AND METHOD OF FACILITATING ENROLLMENT OF A BIOMETRIC TEMPLATE

CROSS-REFERENCE TO RELATED APPLICATIONS

This application claims priority under 35 U.S.C. § 119 to European Patent Application No. 19187534.3, filed on Jul. 22, 2019, the contents of which are incorporated by reference herein

TECHNICAL FIELD

The present disclosure relates to an enrollment device. Furthermore, the present disclosure relates to a method of facilitating enrollment of a biometric template, and to a corresponding computer program.

BACKGROUND

Fingerprint sensing devices, such as capacitive fingerprint sensors, may be integrated into user authentication tokens, for example into smart cards. In order to personalize such a user authentication token, fingerprint reference data should be enrolled into the user authentication token. More specifically, a fingerprint template should be stored in a secure element of the token, so that—in operation—a captured fingerprint can be compared with said template in order to authenticate a user. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. The enrollment of fingerprint reference data is often performed under supervision in a secure environment, for example at the premises of a bank. This process is often not user-friendly and time-consuming. Thus, it is desirable to facilitate enrolling fingerprint reference data into user authentication tokens of the kind set forth.

SUMMARY

In accordance with a first aspect of the present disclosure, an enrollment device is provided, comprising: a token interface unit configured to couple the enrollment device to an external user authentication token; a user interface unit configured to provide visual information to a user through a plurality of optical output elements, said visual information being indicative of a progress of a biometric template enrollment in the authentication token; a user interface control unit configured to receive input data indicative of said progress from the authentication token through the token interface unit and to control the user interface unit using said input data.

In an embodiment, the optical output elements are organized in a linear array or the optical output elements are organized in a circular array.

In an embodiment, the optical output elements are light-emitting diodes.

In an embodiment, the optical output elements have different colors, said different colors being associated with different types of user feedback.

In an embodiment, different subsets of the optical output elements are associated with different types of user feedback.

In an embodiment, at least one of said optical output elements is configured to blink.

In an embodiment, at least one of the optical output elements indicates a successful enrollment of the biometric template in the authentication token.

In an embodiment, at least two optical output elements are associated with iconized representations of ordinal numbers.

In an embodiment, the enrollment device further comprises a power source, such as a battery or a supercapacitor.

In an embodiment, the biometric template is a fingerprint template.

In an embodiment, a template enrollment system comprises an enrollment device of the kind set forth and a user authentication token.

In an embodiment, the user authentication token is configured to detect a finger touch and a finger lift.

In an embodiment, the user authentication token is a smart card, a wearable device, a mobile phone, or a laptop.

In accordance with a second aspect of the present disclosure, a method of facilitating enrollment of a biometric template is conceived, the method comprising: coupling the enrollment device to an external user authentication token through a token interface unit; providing visual information to a user through a plurality of optical output elements comprised in a user interface unit of the enrollment device, said visual information being indicative of a progress of a biometric template enrollment in the authentication token; receiving, by a user interface control unit of the enrollment device, input data indicative of said progress from the authentication token through the token interface unit and controlling the user interface unit using said input data.

In accordance with a third aspect of the present disclosure, a computer program is provided, comprising executable instructions which, when executed, carry out or control a method of the kind set forth.

DESCRIPTION OF DRAWINGS

Embodiments will be described in more detail with reference to the appended drawings, in which.

DESCRIPTION OF EMBODIMENTS

Fingerprint sensing devices, such as capacitive fingerprint sensors, may be integrated into user authentication tokens, for example into smart cards. In order to personalize such a user authentication token, fingerprint reference data should be enrolled into the user authentication token. More specifically, a fingerprint template should be stored in a secure element of the token, so that—in operation—a captured fingerprint can be compared with said template in order to authenticate a user. The enrollment of fingerprint reference data is often performed under supervision in a secure environment, for example at the premises of a bank. This process is often not user-friendly and time-consuming. Thus, it is desirable to facilitate enrolling fingerprint reference data into user authentication tokens of the kind set forth.

More specifically, tokens such as smart wearables or smart cards equipped with a fingerprint-based user authentication function require the user to enroll his biometric credentials (i.e., fingerprint template) as reference data for later verification on the token. For adequate storage, the sensitive biometric credentials must be securely stored within such fingerprint-authenticated tokens. Currently, this enrollment process for payment tokens requires either an external computer, smartphone or internet connection or an enrollment at a bank branch. From a convenience perspective, it would be better to perform fingerprint enrollment on the token in a private environment, i.e. at the premises of the token holder, without compromising the security level of the token. For this purpose, a fingerprint template should be stored safely inside a secure element being embedded in such token. However, before enabling such an enrollment of a fingerprint template, the identity of the user should somehow be verified, so that the correct fingerprint template is enrolled—and not the template of a malicious person, for example when the token has been stolen. As mentioned, this identity verification is typically done at the premises of a token issuer (e.g., a bank), which is not user-friendly and time-consuming.

Figure 1:
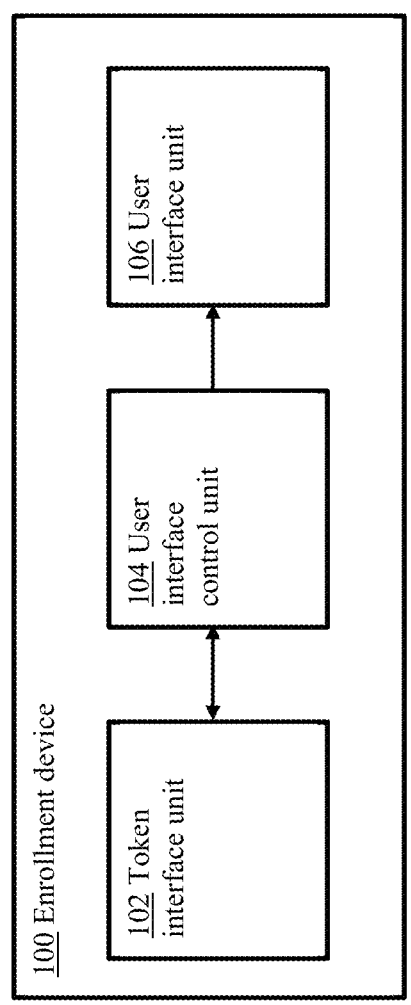
FIG. 1 shows an illustrative embodiment of an enrollment device.

FIG. 1 shows an illustrative embodiment of an enrollment device 100. The enrollment device 100 comprises a token interface unit 102 and a user interface control unit 104 which are operatively coupled to each other. Furthermore, the enrollment device 100 comprises a user interface unit 106 operatively coupled to the user interface control unit 104. The token interface 102 is configured to couple the enrollment device 100 to user authentication token (not shown), which is external to the enrollment device 100. The user interface unit 106 is configured to provide visual information to a user through a plurality of optical output elements (not shown), wherein said visual information is indicative of a progress of a biometric template enrollment in the authentication token. Furthermore, the user interface control unit 104 is configured to receive input data indicative of said progress from the authentication token through the token interface unit 102 and to control the user interface unit 106 using said input data. Thereby, it is achieved that a user can carry out the enrollment process himself, i.e. without supervision at the premises of a token issuer. Furthermore, it is achieved that the user is properly guided through the enrollment process, by means of visual feedback on the progress of the enrollment. This is particularly advantageous if a biometric template has to be enrolled using a relatively small sensor, for example a fingerprint sensor having a size of 8 millimeter by 8 millimeter or smaller.

Figure 2:
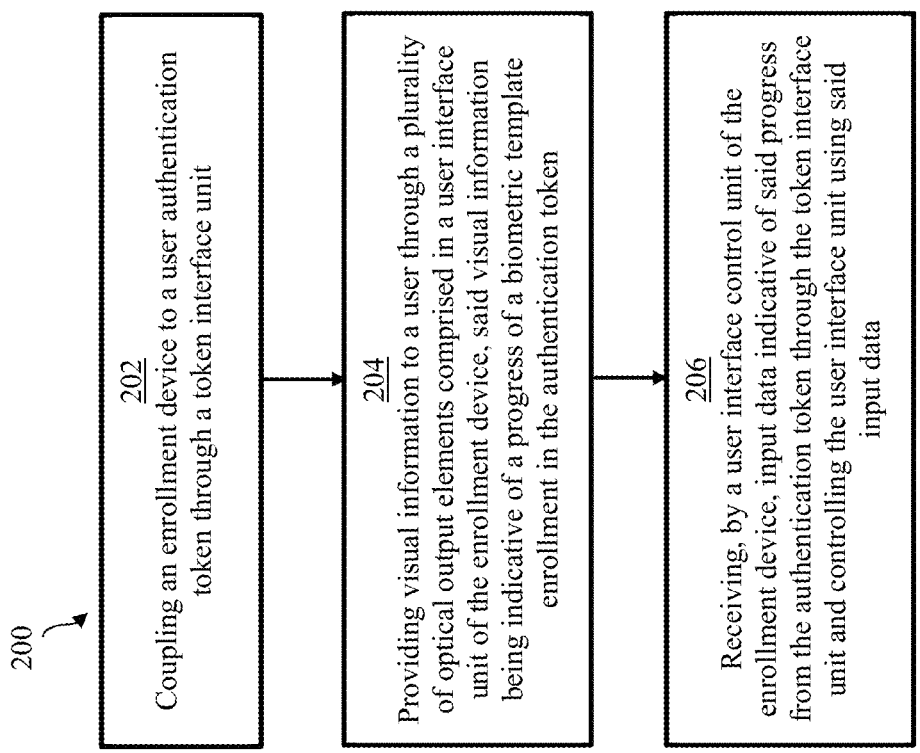
FIG. 2 shows an illustrative embodiment of a method of facilitating enrollment of a biometric template.

FIG. 2 shows an illustrative embodiment of a corresponding method 200 of facilitating enrollment of a biometric template. The method 200 comprises the following steps: at 202, coupling an enrollment device to a user authentication token through a token interface unit, at 204 providing visual information to a user through a plurality of optical output elements comprised in a user interface unit of the enrollment device, said visual information being indicative of a progress of a biometric template enrollment in the authentication token, and at 206, receiving, by a user interface control unit of the enrollment device, input data indicative of said progress from the authentication token through the token interface unit and controlling the user interface unit using said input data.

Figure 3:
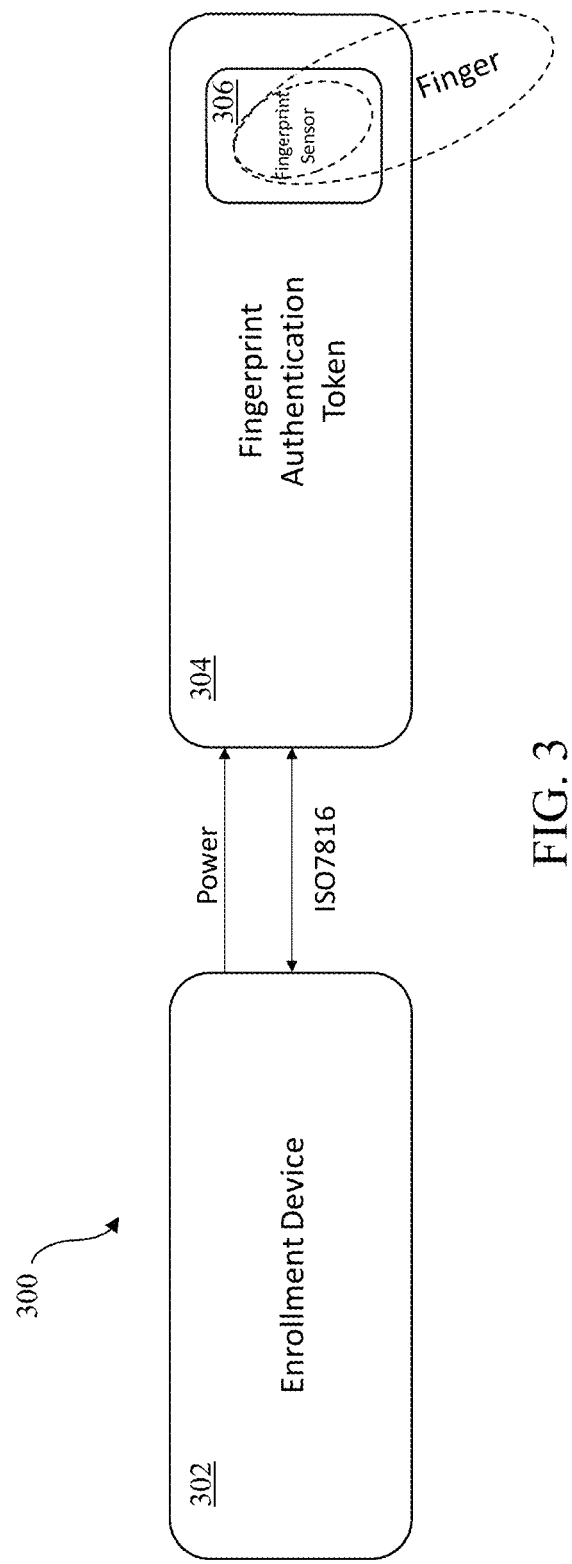
FIG. 3 shows an example of a template enrollment system.

FIG. 3 shows an example of a template enrollment system 300. The system 300 comprises an enrollment device 302 and a fingerprint authentication token 304. The enrollment device 302 facilitates the enrollment of a fingerprint template in the fingerprint authentication token 304. The fingerprint authentication token 304 contains a fingerprint sensor 306, which is configured to capture fingerprint images. Typically, features are extracted from fingerprint images. Feature extraction is the process of deriving biometric features from a fingerprint image. The feature extraction process produces a fingerprint template, which is a data structure encoding biometric features. The fingerprint template is then input to a matcher, which matches the fingerprint template which a reference template. Upon a positive match, the user is successfully authenticated. However, before this authentication process can be applied, the fingerprint authentication token 304 should contain a reference template. The creation and storage of this reference template is referred to as template enrollment. Thus, a purpose of the enrollment device 302 is to facilitate the creation of a reference representation of at least one of the token holder's fingerprints and to store this representation securely within the fingerprint authentication token 304.

Figure 4:
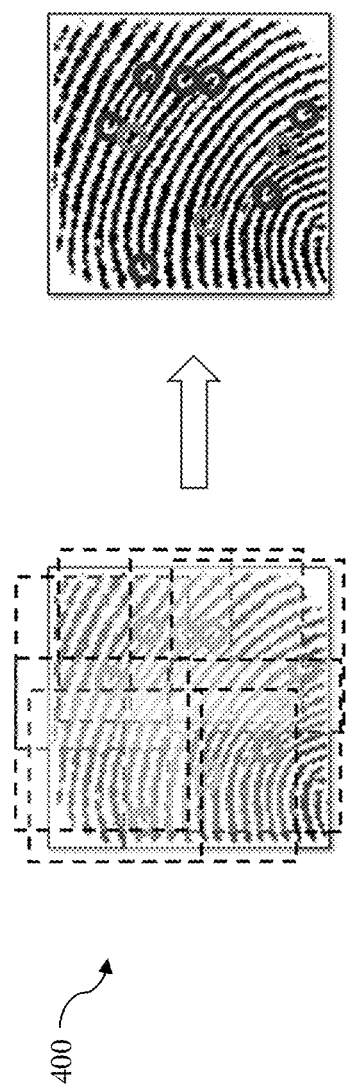
FIG. 4 shows an example of capturing fingerprint features with a small area sensor.

FIG. 4 shows an example of capturing fingerprint features with a small area sensor 400. Fingerprint sensors cover a large area and are thus expensive. To provide economically viable authentication solutions, the sensor size needs to be reduced, targeting sensing areas that are significantly smaller than the fingerprint itself. In case of such small area fingerprint sensors, the area of the fingerprint sensor may not be sufficient to capture all the features of a fingerprint by just one fingerprint sample. Therefore, multiple samples are acquired while slightly changing the finger position relative to the fingerprint sensor. Thus, the fingerprint's features are spread over multiple fingerprint samples.

Figure 5:
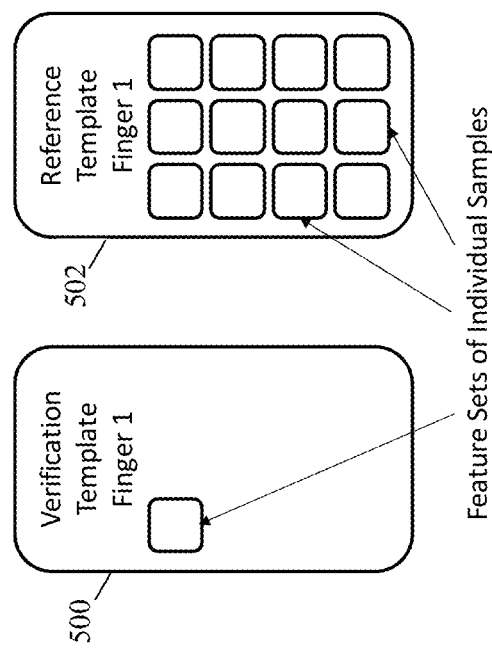
FIG. 5 shows examples of verification and reference templates.

FIG. 5 shows examples of verification and reference templates 500, 502. When a fingerprint authentication request is made, the identity claim of a token holder may be verified by comparing a token holder's live fingerprint sample with its features against a securely stored reference template comprising a complete feature set of the token holder's fingerprint. A feature set is a collection of features. Such features may for example be minutiae, ridge directions and ridge distances, wherein a feature may be described by its type, position and properties. To facilitate the process of verifying an identity claim, the fingerprint samples and their extracted features are organized in templates comprising feature sets. Depending on the type of template, the number of contained feature sets may vary. In case of a fingerprint, a feature set may comprise a list of minutiae characterized by minutia type, position and angle/direction in a reference plane. A reference template may comprise multiple features sets while a verification template may only comprise a single feature set representing the biometrics of a single finger. The smaller the sensor area is relative to the size of the fingerprint, the more feature sets and thus features are required to form a reference template. In case of e.g. 8 mm×8 mm sensor area, approximately 12 to 16 feature sets comprising 6 to 10 features each may be required per finger to generate a reference template that facilitates good biometric performance. For a sensor having a sensing area of 8 mm×8 mm this may sum up to 128 acquired features, which may originate from up to 35 minutiae. Due to shift and rotation, minutiae result in multiple feature detection.

Figure 6:
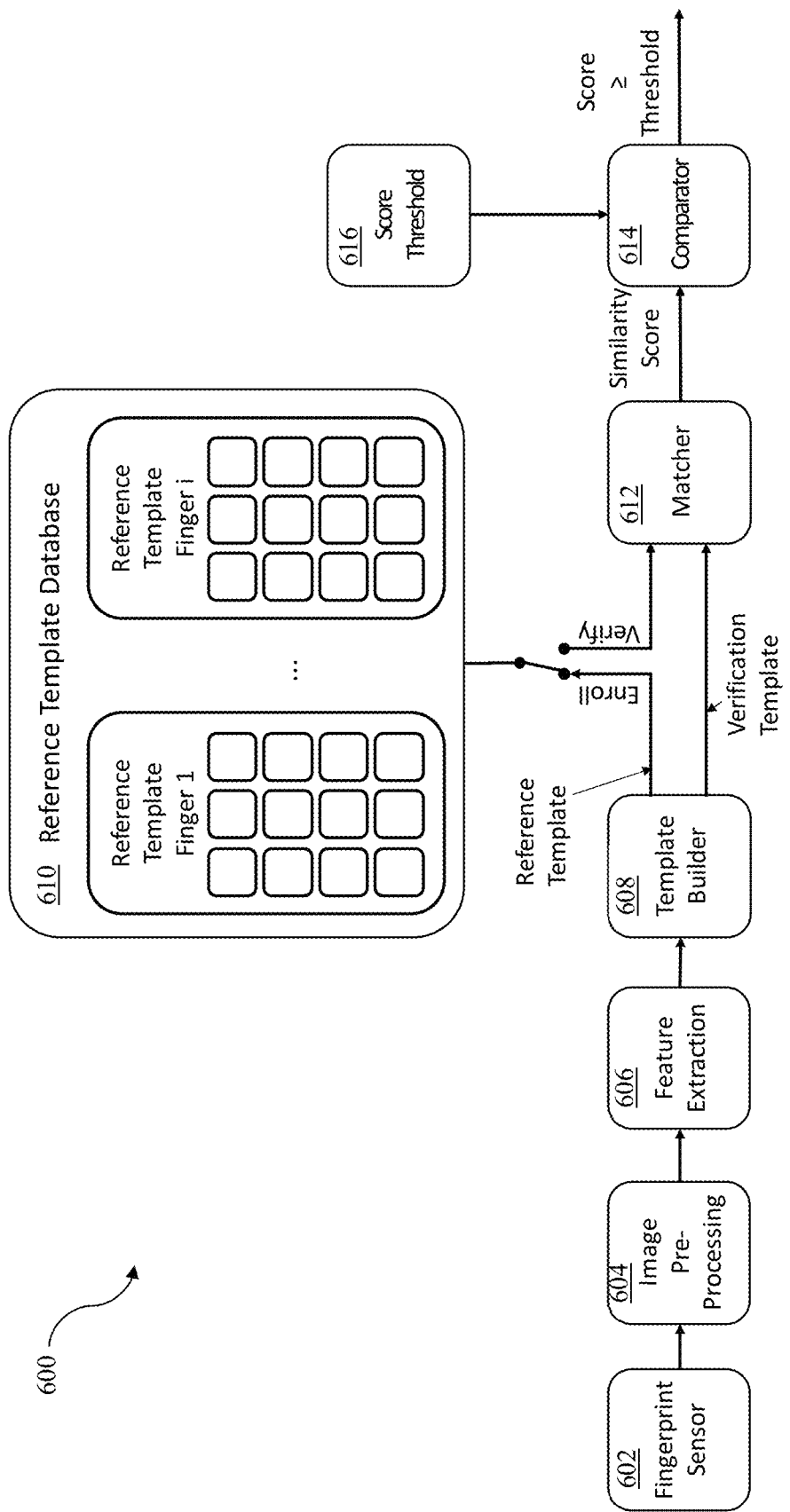
FIG. 6 shows an example of a fingerprint template enrollment and verification system.

FIG. 6 shows an example of a fingerprint template enrollment and verification system 600, also referred to as a biometric subsystem. The biometric subsystem 600 of a fingerprint authentication token may be configured to store reference templates permanently and verification templates temporarily. A biometric system may be operated in at least one of the modes of enrollment and verification. In the enrollment mode, a reference template may be generated from many fingerprint samples and securely stored, while in the verification mode a verification template may normally be generated at least from a single fingerprint sample. For generating a template for a single finger, the following steps may be performed:

acquire fingerprint image samples by means of a fingerprint sensor 602;
pre-process 604 the acquired image samples to optimize them for feature extraction 606;
extract 606 one or more feature sets of one or more optimized images;
compile 608 the extracted feature sets into a single template.

In case of enrollment, the created reference template comprising many feature sets may be securely stored in a reference template database 610 within the biometric token. In case of verification, the created verification template comprising only a single feature set may be forwarded to a matcher 612 embedded in the biometric token. The matcher 612 may retrieve reference templates from the reference template database 610 and may compare that against the verification template. The matcher 612 may generate a similarity score that may be indicative for the probability that the verification template and the reference template have been created from fingerprint samples of the same finger of the same token holder. Finally, the similarity score provided by the matcher 612 may be compared 614 against a minimum acceptance score (Score Threshold 616) that may be required to support the token holder's identity claim. If the similarity score is e.g. equal to or above the Score Threshold 616, the authentication may be regarded as successful, otherwise the authentication may be regarded as unsuccessful.

The enrollment may be executed as a facilitated enrollment at an enrollment facility or as a self-enrollment at a location determined by the token holder (e.g., at home). For a facilitated enrollment, the token holder should travel to an enrollment facility, which may be inconvenient. Thus, many token holders prefer self-enrollment over facilitated enrollment. For self-enrollment, the token holder must be enabled by means of the enrollment device:

to configure the fingerprint authentication token into enrollment mode;
to execute the steps required to generate a reference template from multiple fingerprint samples of one or more fingers;
to securely store the reference template within the fingerprint authentication token;
to verify after enrollment that the authentication token can verify the authentic token holder's identity claims.

To achieve good biometric performance in case of a small area sensor, a sufficiently large number of enrollment samples must be acquired to generate a good reference template. Cost constraints demand the sensing area to be as small as feasible, which means that with a shrinking sensor area an increasing number of enrollment samples must be acquired. Without meaningful feedback provided to the token holder, token holders may become overwhelmed and even annoyed if feedback is not as expected and may thus not finalize the enrollment process. Meaningful feedback as known from mobile devices having textual or graphical displays may not be feasible for thin, small, lightweight and low-cost enrollment devices. Furthermore, in case of small fingerprint sensors, where e.g. more than six samples are required to provide good biometric performance, a very limited user feedback may not be sufficient, because the user needs to be instructed to move his finger so as to provide various samples, for example. For security reasons, tokens capable of self-enrollment may be configured for one-time enrollment only. In that case, failures during enrollment caused by an inadequate user interface may lead to a non-functional token, which requires costly replacement by the token issuer. In case of authentication tokens with embedded feedback indicators, the number of acquired samples may be limited to six or less per finger. If good biometric performance must be achieved at such low numbers of enrolled samples, fingerprint sensors with a sensing area of at least 80 mm$^2$ are required, which may not be feasible or cost effective for certain tokens (e.g. smart cards and wearable devices). Thus, in accordance with the present disclosure, user feedback elements are integrated into an enrollment device, thereby facilitating the production of low-cost biometric tokens while also facilitating a user-friendly template enrollment process.

Figure 7:
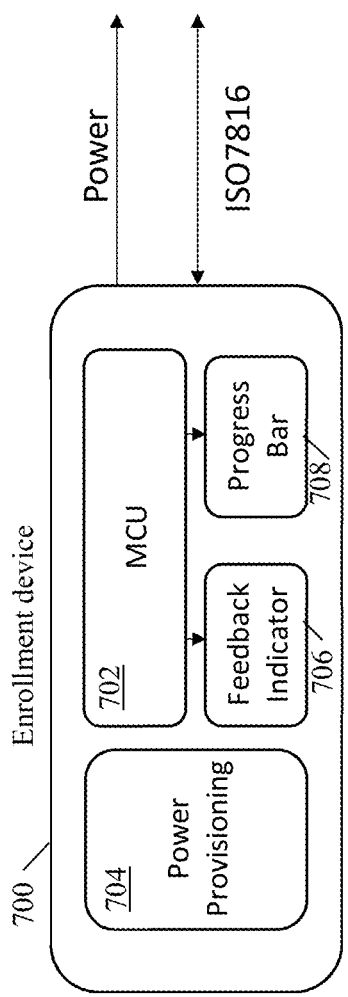
FIG. 7 shows an illustrative embodiment of an enrollment device.

FIG. 7 shows an illustrative embodiment of an enrollment device 700. The enrollment device 700 includes a microcontroller 702, a power provisioning unit 704, at least one feedback indicator 706 and a progress bar 708. In accordance with the present disclosure, the progress bar 708 may comprise a plurality of optical output elements (not shown), by means of which visual information indicative of the progress of a biometric template enrollment is conveyed to the user. The feedback indicator 706 may also comprise an optical output element, which may be configured to provide visual information regarding an error condition, for example. In a practical and effective implementation, the power provisioning unit 704 is an integrated power source, such as a battery or a supercapacitor.

Figure 8:
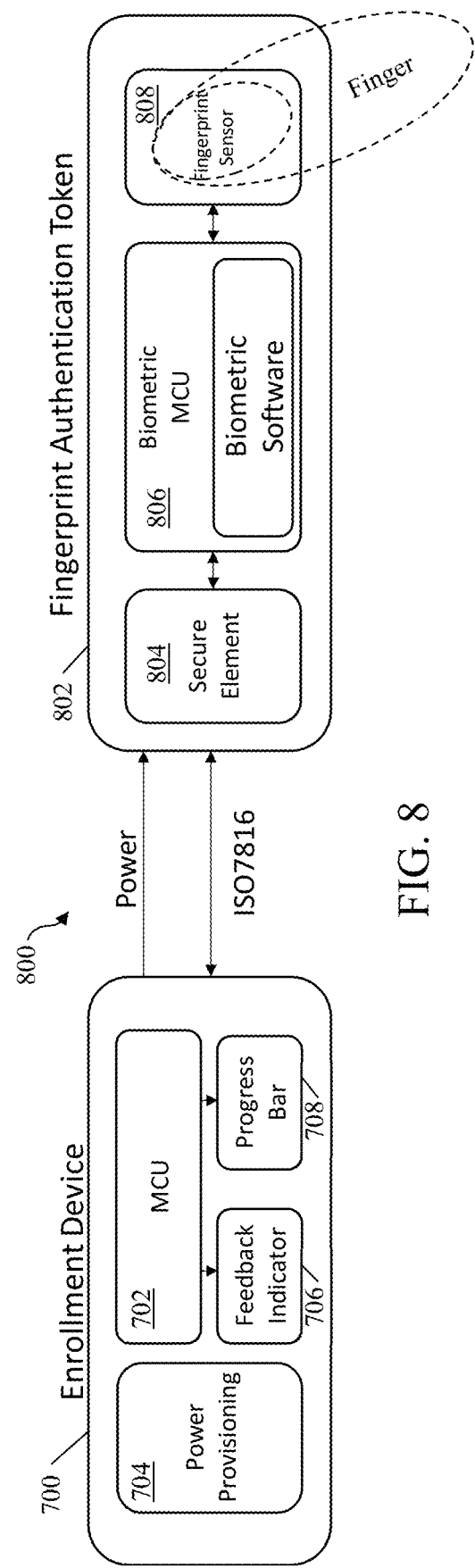
FIG. 8 shows an illustrative embodiment of a template enrollment system.

FIG. 8 shows an illustrative embodiment of a template enrollment system 800. In addition to the enrollment device 700 shown in FIG. 7, the system 800 comprises a fingerprint authentication token 802. In accordance with the present disclosure, the enrollment device 700 comprises a token interface unit (not shown) which is configured to couple the enrollment device 700 to the fingerprint authentication token 802 (i.e., a fingerprint-based user authentication token). In this example, the token interface unit is a contact-based interface conforming to the technical standard ISO/IEC 7816, through which data can be exchanged with the authentication token 802 and power can be provided to said authentication token 802. The fingerprint authentication token 802 comprises a secure element 804, a biometric microcontroller 806 and a fingerprint sensor 808.

In the enrollment setup shown in FIG. 8, the fingerprint authentication token 802 may be configured to receive control commands from the enrollment device 700. Furthermore, the fingerprint authentication token 802 may be configured to provide response information to the enrollment device 700. The enrollment device 700 may be configured to process received response information, supplement that with information generated by the enrollment device 700 itself and provide corresponding user feedback by means of the progress bar 708 and supplementary feedback indicators 706. The progress bar 708 may be composed of individual feedback elements, i.e. optical output element, thereby forming a display.

The control commands may be configured to stimulate the authentication token to:
 check the fingerprint authentication token's health status;
 configure the authentication token to wait for finger touch and to acquire a fingerprint sample if a touch is detected;
 pre-process the acquired fingerprint sample and extract biometric features;
 compile a reference template from extracted biometric features;
 compile a verification template from extracted biometric features;
 configure the authentication token to compare a verification template with a reference template and to decide upon whether a token holder is genuine or an imposter;
 store a reference template permanently.

The response information may be indicative of:
 approval of a received command;
 one or more errors during a command transmission;
 health status of the fingerprint authentication token;
 the fingerprint authentication token having detected a finger touch;
 the fingerprint authentication token having detected a finger lift;
 the fingerprint authentication token having acquired a fingerprint sample;
 the successfully acquired fingerprint sample count;
 the ordinal number of the finger being enrolled;
 the result of matching a verification template versus a reference template and further failure conditions:
 enrollment successful;
 critical power condition of enrollment device;
 token already enrolled and locked for further enrollment;
 no token communication;
 token malfunction;
 acquisition error;
 verification error;
 enrollment error;
 timeout error.

Figure 9:
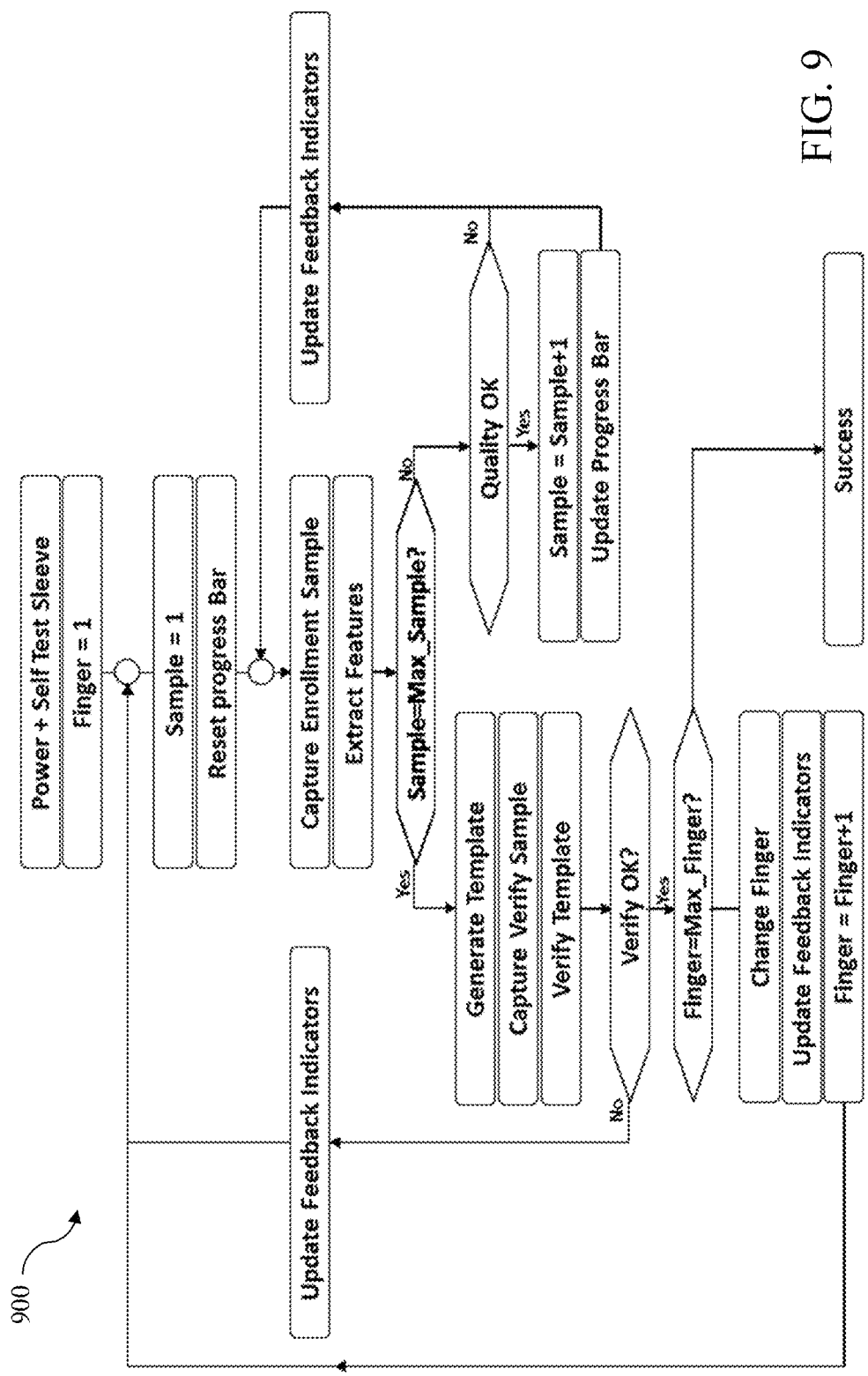
FIG. 9 shows an illustrative embodiment of a template enrollment process.

FIG. 9 shows an illustrative embodiment of a template enrollment process 900. After power-up and self-test, an outer "Finger Loop" may be started. For every finger to be enrolled, an inner "Sample Loop" may be executed. The "Sample Loop" may acquire a required amount of "Max_Samples", may check whether the sample quality enables extraction, and if so, may extract the related feature set and may add it to a temporary template. If the sample quality is insufficient, sample capturing may be repeated. When all feature sets of "Max-Sample"-samples have been added to the temporary template, an additional sample may be acquired and utilized to generate a verification template. Next, the verification template may be verified against the temporary reference template. In case of positive verification, the temporary reference template may be judged acceptable and stored permanently; otherwise the "Sample_Loop" may be repeated for a predefined number of times. Enrollment may be accomplished when the "Finger-Loop" has been successfully executed the number of times indicated by "Max_Finger". To avoid endless looping in case of errors, error conditions such as a maximum number of low-quality samples per "Sample_Loop" and a maximum number of unsuccessful "Sample_Loops" may provide loop exit criteria. The enrollment device may not have to control all the execution steps if the fingerprint authentication token is configured to execute those steps which are not being executed by the enrollment device. The steps of power-up, self-test of the enrollment device and stimulation of the outer "Finger_Loop" will be controlled by the enrollment device. Furthermore reception, decoding and display of response information will be performed by the enrollment device. It is beneficial to let the authentication token control as much as possible of these steps, as this would facilitate for example a standardization of the enrollment device, because specific requirements for the enrollment procedure given by a payment network provider may be fully handled by the token. Standardization may require a standardized command to start self-enrollment and a set of standardized response messages that may cover all feedback information to be provided to the token holder.

In an embodiment, the optical output elements are organized in a linear array or the optical output elements are organized in a circular array. Both a linear array and a circular array may result in a practical and effective implementation, which does not occupy much space and which is relatively easy to manufacture. For example, such arrays may easily be integrated into a casing of the enrollment device. Furthermore, in a practical and effective implementation, the optical output elements are light-emitting diodes. Light-emitting diodes are small and energy-efficient.

Figure 10B:
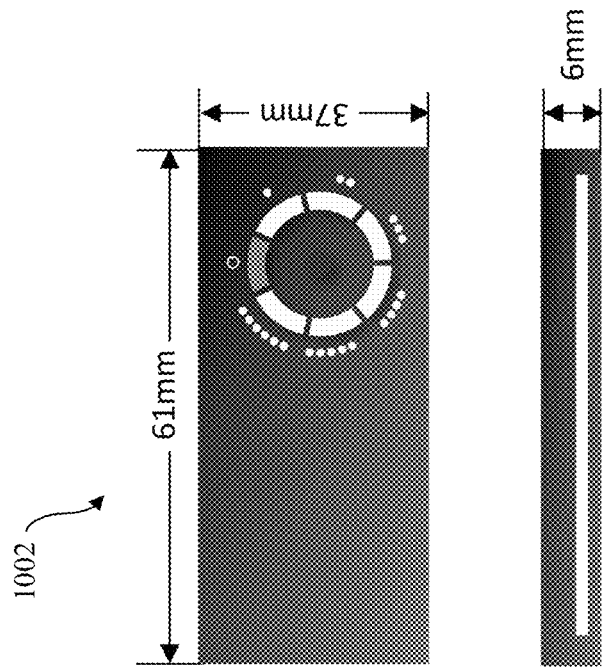
FIG. 10B shows another illustrative embodiment of an enrollment device casing.
Figure 10A:
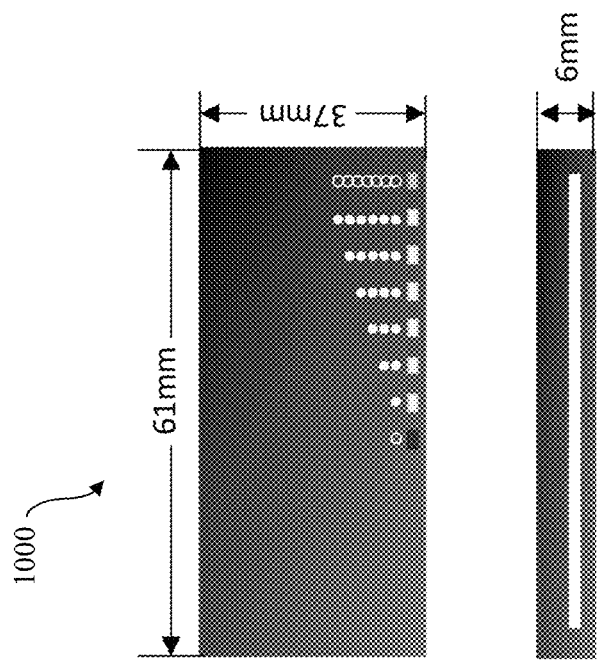
FIG. 10A shows an illustrative embodiment of an enrollment device casing.

FIG. 10A shows an illustrative embodiment of an enrollment device casing 100. In this embodiment, the optical output elements are organized in a linear array. It is noted that the dimensions shown are merely examples; the skilled person will appreciate that other dimensions are possible too.

FIG. 10B shows another illustrative embodiment of an enrollment device casing 1002. In this embodiment, the optical output elements are organized in a circular array. It is noted that the dimensions shown are merely examples; the skilled person will appreciate that other dimensions are possible too.

Thus, all components forming the enrollment device may be comprised in a casing, in which a progress indicator is embedded. The casing may have a volume of less than 20 cm$^3$. The weight of the enrollment device may be small enough to ensure that the fingerprint authentication token with the enrollment device coupled thereto may be operated in a very similar manner as if a token (e.g., a smart card) were presented for authentication to an authentication terminal. Thus, fingerprint samples acquired by this device may be of very similar quality as samples acquired when the token is presented to an authentication terminal, which may yield low False Reject Rates (FRR). The enrollment device may be equipped with an energy storage unit, for example a primary battery cell, a secondary battery cell or a supercapacitor. A good example for such energy storage is a CR2016 Lithium coin cell battery. To keep the casing thin, the user interface may be constructed from thin optical feedback indicators, e.g. very thin light-emitting diodes (LEDs). Other displays, such as LCD displays, would require thicker casings and a more complex control, but are not excluded. Thus, instead of LEDs, other optical output elements can be used too. The enrollment progress may be symbolized in an analog style, i.e. without applying any unsteady attributes such as blinking, resulting in a steady display. Analog progress indicators are much easier to understand, also for token holders who are not technically skilled.

Two embodiments of such user interfaces are shown in FIGS. 10A and 10B. FIG. 10A shows a progress indicator comprising linearly organized feedback elements, while FIG. 10B shows a progress indicator comprising circularly organized feedback elements. The circular configuration may provide a better representation of the recurring finger sampling loop, but may be more complex to integrate into an enrollment device.

Figure 11A:
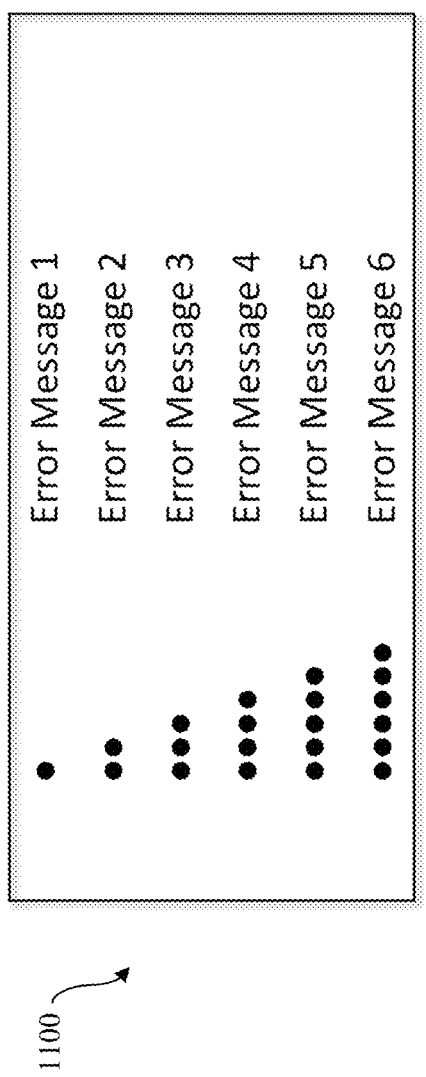
FIG. 11A shows an illustrative embodiment of iconized representations of ordinal numbers.

FIG. 11A shows an illustrative embodiment of iconized representations of ordinal numbers 1100. In the embodiment shown in FIG. 10A the feedback elements constituting the progress indicator are labeled with an iconized representation of their ordinal number, e.g. progress bar element 1 may be labeled by one icon element, progress bar element 2 may be labelled by two icon elements and so forth. Thus, in an embodiment, at least two optical output elements are associated with iconized representations of ordinal numbers. This may enable a simple link to a written feedback message provided by a supplementary user instruction manual, as shown in FIG. 11A. Experiments with test persons yielded, that such iconized labelling makes it easier for the token holder to identify a corresponding text message in a user manual, especially if the messages may be sorted according to the ordinal number of the related icon elements. This approach may also simplify the generation and maintenance of such a user instruction manual.

In an embodiment, the optical output elements have different colors, said different colors being associated with different types of user feedback. This facilitates giving adequate feedback to a user. For instance, a red indicator may be used to indicate an error condition, and a green color may be used to indicate a successful verification. Thus, it may be beneficial to assign meaningful colors to the feedback indicator elements, for example the colors mentioned in Table 1. Such a color allocation may be adjusted to local requirements, given that for example the specific colors indicating failure, success and neutral may vary by country. However, token holders who are not able to distinguish the applied colors (e.g., color blind token holders) may still receive meaningful feedback through the feedback indicator element's position and the associated icon.

TABLE 1

| Color | Meaning |
| --- | --- |
| Red | Negative feedback: verification error other error condition (indicated by index indicator) |

TABLE 1-continued

| Color | Meaning |
| --- | --- |
| Green | Positive feedback acquisition/verification/ enrollment successful |
| Yellow | Enrollment Guidance progress indicator change finger request error index indicator |

Figure 11B:
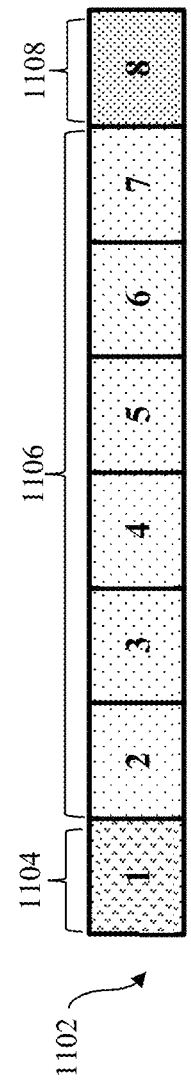
FIG. 11B shows an illustrative embodiment of a linear array of optical output elements.

FIG. 11B shows an illustrative embodiment of a linear array of optical output elements 1102. In this embodiment, feedback indicator element 1 (i.e., optical output element 1104) may represent negative feedback, the display indicator elements 2-7 (i.e., optical output elements 1106) may form the progress indicator, and feedback indicator element 8 (i.e., optical output element 1108) may represent positive feedback. Furthermore, optical output element 1104 may have a red color, optical output elements 1106 may have a yellow color, and optical output element 1108 may have a green color. The optical output elements do not necessarily need not be arranged in a linear style as shown in FIG. 11B; the skilled person may envisage other arrangements of optical output elements while maintaining the logical meaning of the individual optical output elements. For instance, the optical output elements may be arranged in a circular array. Furthermore, in an embodiment, different subsets of the optical output elements are associated with different types of user feedback. In the present example, optical output element 1104 may provide generic negative feedback (e.g., about generic error conditions), optical output elements 1106 may show the progress of the template enrollment (e.g., including specific success and error conditions for each step of the enrollment process), and optical output element 1108 may provide generic positive feedback (e.g., enrollment successfully completed). Thus, in an embodiment, at least one of the optical output elements indicates a successful enrollment of the biometric template in the authentication token. This further facilitates giving adequate feedback to a user.

Figure 12:
FIG. 12 shows how an enrollment device is coupled to an authentication token.

FIG. 12 shows how an enrollment device is coupled to an authentication token. In a first state 1202, the authentication token has not yet been coupled to the enrollment device. In a second state 1204, the authentication token has been coupled to the enrollment device through a contact-based interface. In this example, the authentication token is a smart card. However, the authentication token may also be another device, such as a wearable deice, a mobile phone, or a laptop. In general, the authentication token may be any device having a biometric sensor, for example a fingerprint sensor, in particular a biometric sensor having a small area.

Figure 13:
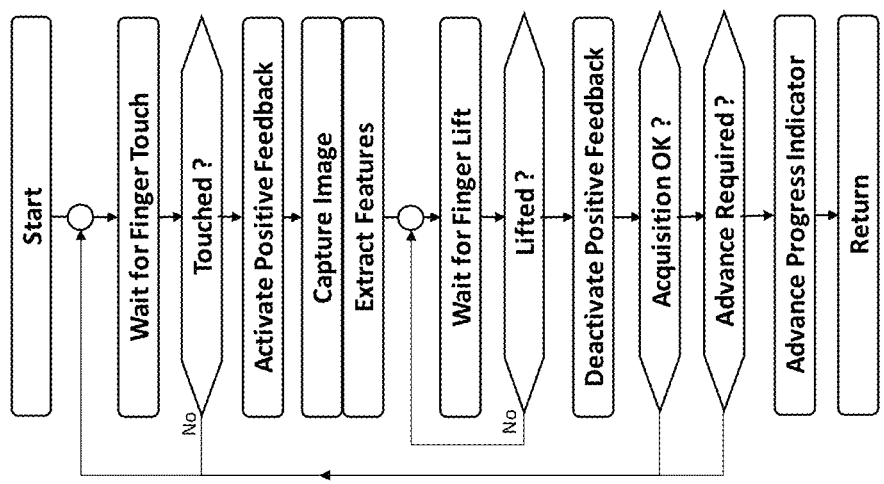
FIG. 13 shows an illustrative embodiment of a timing of a fingerprint image capturing.

FIG. 13 shows an illustrative embodiment of a timing of a fingerprint image capturing 1300. According to this embodiment, the token holder may control the fingerprint acquisition timing. This approach avoids overwhelming the token holder by a too tight acquisition timing. Instead, the token holder may take his time to understand and explore the acquisition principle and, when understood, may increase the acquisition speed. Ensuring that the token holder may enroll without time pressure may have a positive impact on the FRR. To facilitate this approach, the authentication token may be configured to detect a finger touch and a finger lift. The capture process may wait for the token holder to present his finger to the token's sensor. The acquisition process may only proceed if the finger touch has been detected. The process proceeds with activation of a positive feedback indicator, which signals the token holder that his fingerprint has been acquired and that he may lift his finger. During the token holder's reaction time, the process proceeds further with feature extraction and storage. After finalization of the feature extraction, the authentication token may wait for the token holder to lift his finger. As soon as a finger lift has been detected, the positive feedback indicator may be deactivated, and the process may conclude with a check whether acquisition was successful and whether the progress indicator may require advance. If required, the progress indicator may be advanced.

Basically, the capturing process shown in FIG. 13 comprises the following handshake mechanism:
finger touched
positive feedback activated (e.g. optical output element 1108 in FIG. 11B turned on)
finger lifted
positive feedback deactivated (e.g. optical output element 1108 in FIG. 11B turned off)
progress indicator advanced if required (e.g. a next one of the optical output elements 1106 in FIG. 11B is turned on)
This handshake mechanism provides the token holder full control over the enrollment sequence timing, thus avoiding overwhelming the token holder by a too tightly dictated timing. For signaling readiness to the token holder, the first progress indicator element (e.g., the first one of optical output elements 1106 shown in FIG. 11B) may be activated directly following power-up and/or device test.

In an embodiment, at least one of the optical output elements is configured to blink. This further facilitates giving adequate feedback to a user. In particular, if a token holder should be informed to change his finger, a signal that may be well differentiated from all other signals may be issued. Such differentiation may be achieved by allocating a blinking attribute to the progress indicator. To make the blinking attribute unique and recognizable, it may only be allocated to such a finger change signal. Possible combinations of feedback signal indicators that may be used for a progress bar are shown in Table 2.

Figure 14:
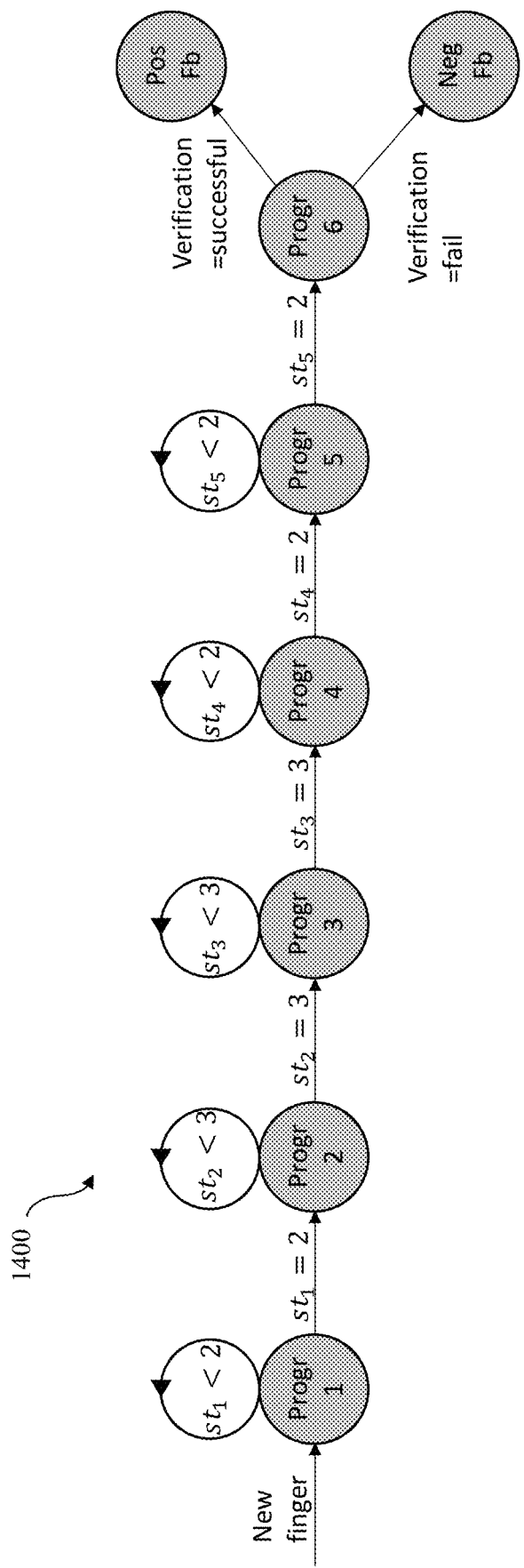
FIG. 14 shows an illustrative embodiment of progress indicator transition states.

FIG. 14 shows an illustrative embodiment of progress indicator transition states 1400. Assuming the number of fingerprint samples to be acquired for one finger is s, and the number of progress indicator elements is p (e.g., the number of optical output elements 1106 shown in FIG. 11B), the number of transitions t between the number of progress indicator state transitions may be calculated as:

$$t = p - 1 \quad \text{(Eq. 1)}$$

For (s≥t), the number of samples Δs that are to be acquired before the progress indicator may progress may be calculated as:

$$\Delta s = \max\left(\text{int}\left(\frac{s}{t}\right) = \text{int}\left(\frac{s}{p-1}\right), 1\right) \quad \text{(Eq. 2)}$$

Since the progress bar may only progress in integer increments, the increment is rounded off to the next integer. It may be important to safeguard that the increment Δs is at least 1. Due to the round-off approach, the final progress indicator may not be activated as desired, as m samples are missing to progress to the last progress indicator element. This number m may be calculated as:

$$m = s - t * \Delta s = s - (p-1) * \Delta s = s - (p-1) * \text{int}\left(\frac{s}{p-1}\right) \quad \text{(Eq. 3)}$$

In some embodiments, the m missing increment steps are allocated to the increments $\Delta s_i$ of the t state transitions St such that beginning from a center state transition $st_c$ the increments $\Delta s_i$ are increased by 1 until m increment steps have been allocated. The state transitions are for an example with s=10 and p=6 shown by the simplified state diagram of FIG. 14 (sample acquisition neglected). The individual states may be mapped to display codes as shown in Table 2.

TABLE 2

| | 1 red | 2 yellow | 3 yellow | 4 yellow | 5 yellow | 6 yellow | 7 yellow | 8 green |
|---|---|---|---|---|---|---|---|---|
| Ready to acquire 1st sample | X | | | | | | | |
| 1st sample acquired | X | | | | | | | X |
| Ready to acquire 2nd sample | X | X | | | | | | |
| 2nd sample acquired | X | X | | | | | | X |
| Ready to acquire 3rd sample | X | X | X | | | | | |
| 3rd sample acquired | X | X | X | | | | | X |
| ... | ... | ... | ... | ... | ... | ... | ... | ... |
| Ready to acquire nth sample | X | X | X | X | X | | | |
| nth sample acquired | X | X | X | X | X | | | X |
| Ready to sample verification sample | X | X | X | X | X | X | | |

To design a user-friendly progress indicator sequence, it may be useful to bear in mind that the token holder may not be familiar with the enrollment process. For example, in case of a token being configured for one-time enrollment, the token holder may have no knowledge about the enrollment process. Therefore, the sequence advance may be configured to start gently, e.g. by requiring less acquisition to proceed at the start of the sequence. At the end of the sequence, the token holder may lose patience; therefore, the advance may again require less acquisition samples. For the middle part of the enrollment process, one more sample required to advance may be acceptable. A method of designing a good progress sequence may take the following form.

The sequence of updating the increments $\Delta s_i$ involves increasing/decreasing the index i by −1, +1, −2, +2 and so forth. Using this approach, the transitions having an increased increment are grouped approximately symmetrically around a center state transition $st_c$, wherein the index c may be calculated as:

$$c = \text{int}\left(\frac{p+1}{2}\right) = 1 + \text{int}\left(\frac{t}{2}\right) \quad \text{(Eq. 4)}$$

In an example, the settings s=12, p=6 may result in the following values:

$$\Delta s = \text{int}\left(\frac{12}{6-1}\right) = 2 \quad \text{(Eq. 5)}$$

$$m = 12 - (6-1)*2 = 2 \quad \text{(Eq. 6)}$$

$$c = \text{int}\left(\frac{6+1}{2}\right) = 3 \quad \text{(Eq. 7)}$$

$$st_1 = 2, st_2 = 2+1, st_3 = 2+1, st_4 = 2, st_5 = 2 \quad \text{(Eq. 8)}$$

It is noted that progressing may require less samples in the initial state transition, which may help the token holder to become quickly familiar with the enrollment procedure. In some embodiments, the samples that should be acquired to transit from the initial state to the following state may be set to an arbitrary number, e.g. a low number. This may be required to adapt to the needs of unexperienced token holders. Under the assumption, that the first transition is set to an arbitrary number a, formulas (Eq. 1) . . . (Eq. 4) may be applied by substituting for p, t and s by $p_{new}$, $t_{new}$ and $s_{new}$ as follows:

$$p_{new} = p-1 \quad \text{(Eq. 9)}$$

$$t_{new} = p-2 \quad \text{(Eq. 10)}$$

$$s_{new} = s-\alpha \quad \text{(Eq. 11)}$$

For embodiments with (s<t), the index j of the transition states may be calculated from the ordinary number i of the sample as:

$$j = \text{int}\left(\frac{i}{s}*t\right) \quad \text{(Eq. 12)}$$

In an example, the settings s=4, p=6 may yield the indices:

$$j_{(i=1)} = \text{int}(1/4*(6-1)) = 1 \quad \text{(Eq. 13)}$$

$$j_{(i=2)} = \text{int}(2/4*(6-1)) = 2 \quad \text{(Eq. 14)}$$

$$j_{(i=3)} = \text{int}(3/4*(6-1)) = 3 \quad \text{(Eq. 15)}$$

$$j_{(i=4)} = \text{int}(4/4*(6-1)) = 5 \quad \text{(Eq. 16)}$$

In some embodiments, with (s<t), the number of transition t is reduced to number of transitions $t_r$, with:

$$t_r = s \quad \text{(Eq. 17)}$$

which is adequate to:

$$p = s+1 \quad \text{(Eq. 18)}$$

In the latter case, the number of progress indicator elements may be reduced to provide meaningful user feedback and to avoid that the progress indicator progresses by more than one process indicator position. When all required samples have been acquired for one finger, a reference template may be generated for that finger and securely stored within the authentication token, but without enabling the template for ordinary authentication. Next, a verification sample may be acquired and processed into a verification template, which may be matched against the previously stored reference template. In case of a positive match, the reference template may be enabled for ordinary authentication and thus permanently stored, and the positive feedback indicator may be activated to signal a positive verification. In case of a negative verification result, the generated reference template may be deleted again, and an error message as indicated below may be issued. If all required reference templates have been positively verified, the positive feedback indicator may be permanently activated, indicating a successful enrollment to the token holder. The token holder may finalize the enrollment by removing the token from the enrollment device.

Furthermore, in some embodiments, the feedback indicator elements may be utilized in an alternative mode to provide differentiated feedback on error conditions. For this purpose, the feedback indicator representing negative feedback and optionally at the same time one of the progress indicator elements may be activated concurrently (see Table 3). The iconized representation of the feedback indicator elements may then be applied to facilitate a look up in a table printed in the user instruction manual, to provide textual error feedback to the token holder. Thus, the design of the enrollment device may be made language-independent. The language conversion may be best achieved by the user instruction manual, which can be updated and translated easily. Another benefit of this approach is that the manufacturing cost of the enrollment device is lower, due to a higher achievable volume of a one-design-fits-all approach. Furthermore, it may be beneficial to assign a generic verification error or a persistent acquisition error only to the negative feedback indicator. In some embodiments, multiple error messages may be allocated to the same combination of feedback indicator elements to reduce the number of error messages that must be recognized by the token holder, to avoid overwhelming the token holder.

TABLE 3

|  | 1 red | 2 yellow | 3 yellow | 4 yellow | 5 yellow | 6 yellow | 7 yellow | 8 green |
|---|---|---|---|---|---|---|---|---|
| Verification Error | X | | | | | | | |
| Battery Low | X | X | | | | | | |
| No Token Communication | X | | X | | | | | |
| Token Malfunction | X | | | X | | | | |
| Token already enrolled | X | | | | X | | | |
| Move finger more | X | | | | | X | | |
| Acquisition Error | X | | | | | | X | |

Figure 15:
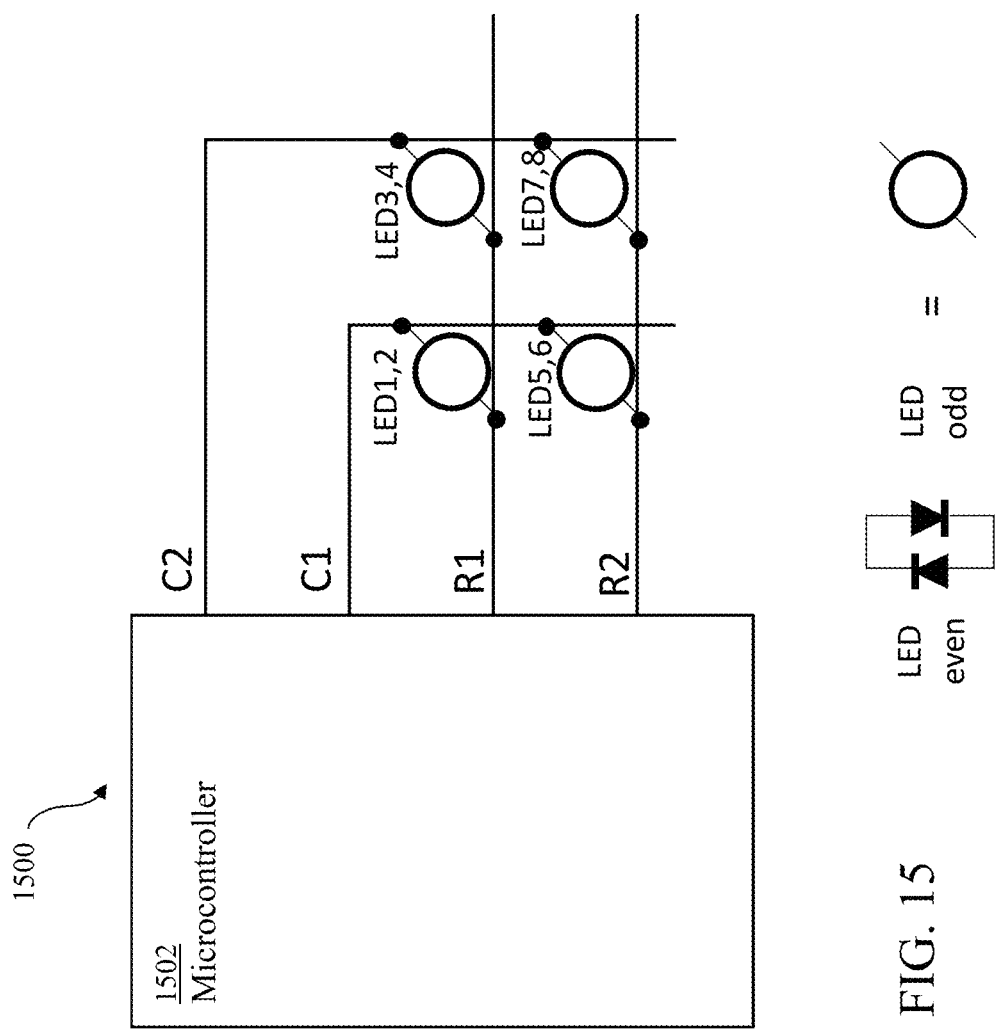
FIG. 15 shows an illustrative embodiment of a display control system.

FIG. 15 shows an illustrative embodiment of a display control system 1500. As mentioned, the optical output elements may be light-emitting diodes (LEDs). In the system 1500, these LEDs are controller by a microcontroller 1502, using four control signals R1, R2, C1, C2. This results in an implementation that supports enrollment devices having a low-cost (low pin-count) microcontroller (MCU). In this system 1500, the three states High, Low and High Impedance (Hi-Z, input mode) may be utilized to control antiparallel LEDs. A feasible truth table for realizing control of eight LEDs is shown as Table 4. The LEDs may be time-multiplexed. Time-multiplexing may reduce the luminance of the LEDs, as the duty cycle for one LED may be just 1/1. The duty cycle may be improved by proper allocation of LEDs to logical signals, specifically the progress indicator elements. It may be feasible that more than one LED may be activated concurrently, which may reduce the number of LED combinations required to signal a certain state, which may result in an increased duty cycle. The skilled person may add more signals Ri, Ci to control more LEDs, if needed. The skilled person will appreciate that, for the implementation of the display shown in FIG. 11B, not more than three different states may be needed to display any of the required display states, thus improving the duty cycle to 33% or more. Furthermore, no series resistors may be needed to protect the driver circuitries supplying the logical signals R1, R2, C1, C2, thus resulting in a low-cost user interface implementation.

TABLE 4

| LED | C1 | C2 | R1 | R2 |
|-----|-----|-----|-----|-----|
| 1 | H | HiZ | L | HiZ |
| 2 | L | HiZ | H | HiZ |
| 3 | HiZ | H | L | HiZ |
| 4 | HiZ | L | H | HiZ |
| 5 | H | HiZ | HiZ | L |
| 6 | L | HiZ | HiZ | H |
| 7 | HiZ | H | HiZ | L |
| 8 | HiZ | L | HiZ | H |

Figure 16B:
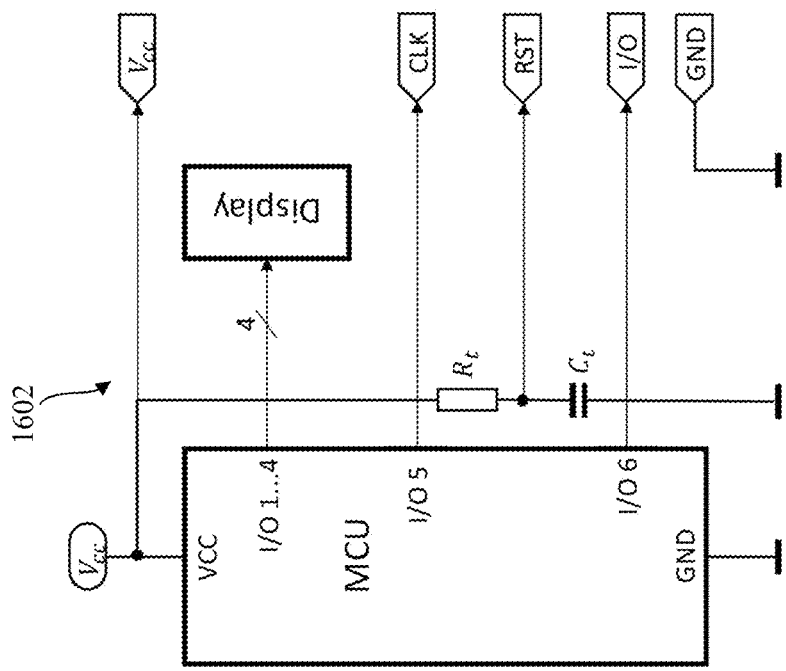
FIG. 16B shows another illustrative embodiment of a display control system.
Figure 16A:
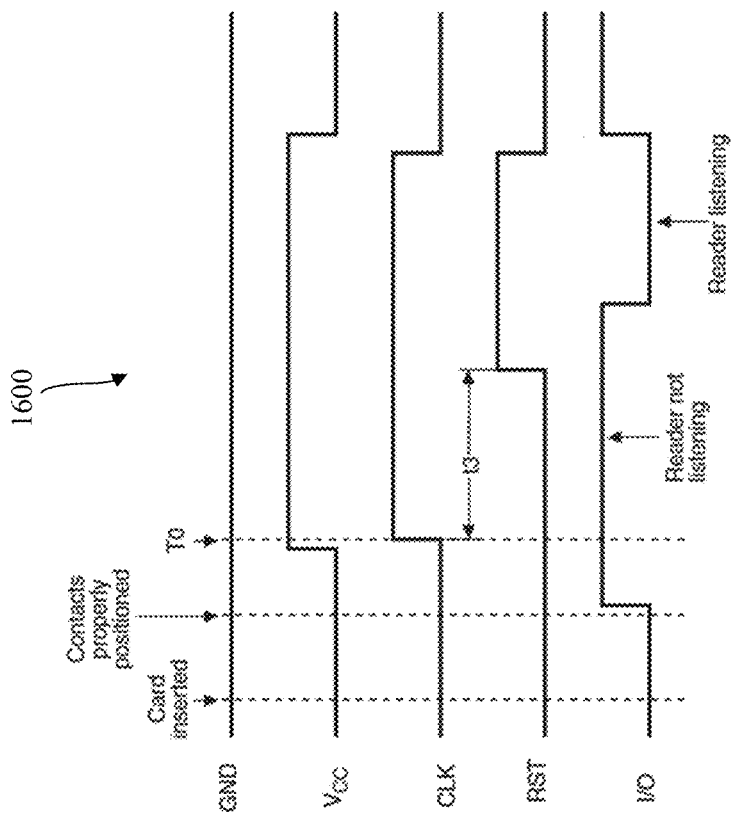
FIG. 16A shows a signal timing diagram for a display control system.

FIGS. 16A and 16B show a signal timing diagram 1600 for a display control system, and a corresponding illustrative embodiment of a display control system 1602. In this embodiment, the display control system shown in FIG. 15 is supplemented by an contact-interface for communication with the authentication token, resulting in a low-cost implementation of the enrollment device utilizing an 8-pin MCU. In this embodiment, the timing for the RST-signal may be defined by the RC-combination of Rt,Ct , thus saving one I/O pin. If needed, the RST-signal may be generated by means of R1, R2, C1, C2 without a visible impact on the feedback indicator functionality.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 enrollment device
102 token interface unit
104 user interface control unit
106 user interface unit
200 method of facilitating enrollment of a biometric template
202 coupling an enrollment device to a user authentication token through a token interface unit
204 providing visual information to a user through a plurality of optical output elements comprised in a user interface unit of the enrollment device, said visual information being indicative of a progress of a biometric template enrollment in the authentication token
206 receiving, by a user interface control unit of the enrollment device, input data indicative of said progress from the authentication token through the token interface unit and controlling the user interface unit using said input data
300 template enrollment system
302 enrollment device
304 fingerprint authentication token
306 fingerprint sensor
400 capturing fingerprint features with a small area sensor
500 verification template finger 1
502 reference template finger 1
600 fingerprint template enrollment and verification system
602 fingerprint sensor
604 image pre-processing
606 feature extraction
608 template builder
610 reference template database
612 matcher
614 comparator
616 score threshold
700 enrollment device
702 microcontroller
704 power provisioning
706 feedback indicator
708 progress bar
800 template enrollment system
802 fingerprint authentication token
804 secure element
806 biometric microcontroller
808 fingerprint sensor
900 template enrollment process
1000 enrollment device casing
1002 enrollment device casing
1100 iconized representations of ordinal numbers
1102 linear array of optical output elements
1104 optical output element
1106 optical output elements
1108 optical output element
1202 first state of enrollment device coupling
1204 second state of enrollment device coupling
1300 timing of fingerprint image capturing
1400 progress indicator transition states
1500 display control system
1502 microcontroller
1600 signal timing diagram for display control system
1602 display control system

The invention claimed is:

1. An enrollment device, comprising:
a processor; and
a memory storing a computer program executable by a processor, the computer program comprising:
token interface instructions, when executed by the processor, couple the enrollment device to an external user authentication token, wherein the user authentication token includes a fingerprint sensor;
user interface instructions, when executed by the processor, provide visual information to a user through a plurality of optical output elements, said visual information being indicative of a progress of a fingerprint template enrollment in the authentication token; and
user interface control instructions, when executed by the processor, receive input data indicative of said progress from the authentication token through the token interface instructions and to control the user interface instructions using said input data,
wherein the enrollment device is configured to transmit control commands to the user authentication token using the token interface instructions, to process response information received from the user authentication token through the token interface instructions, and to provide corresponding user feedback through the user interface instructions, wherein the user authentication token is configured to detect a finger touching the fingerprint sensor and to detect the finger lifting from the fingerprint sensor, and in response to the finger touch, an optical output element of the plurality of optical elements is activated to provide a positive feedback indication, and in response to a fingerprint being acquired from the finger, the optical output element is deactivated indicating that the fingerprint has been acquired and the finger may be lifted from the fingerprint sensor, thereby allowing the user of the user authentication token to control timing of fingerprint acquisition.

2. The enrollment device of claim 1, wherein the optical output elements are organized in a linear array or wherein the optical output elements are organized in a circular array.

3. The enrollment device of claim 1, wherein the optical output elements are light-emitting diodes.

4. The enrollment device of claim 1, wherein the optical output elements have different colors, said different colors being associated with different types of user feedback.

5. The enrollment device of claim 1, wherein different subsets of the optical output elements are associated with different types of user feedback.

6. The enrollment device of claim 1, wherein at least one of said optical output elements is configured to blink.

7. The enrollment device of claim 1, wherein at least one of the optical output elements indicates a successful enrollment of the biometric template in the authentication token.

8. The enrollment device of claim 1, wherein at least two optical output elements are associated with iconized representations of ordinal numbers.

9. The enrollment device of claim 1, further comprising a power source, such as a battery or a supercapacitor.

10. The enrollment device of claim 1, wherein the biometric template is a fingerprint template.

11. The enrollment device of claim 1, wherein the enrollment device and the user authentication token are implemented in a template enrollment system.

12. The enrollment device of claim 11, wherein the user authentication token is configured to detect a finger touch and a finger lift.

13. The enrollment device of claim 11, wherein the user authentication token is a smart card, a wearable device, a mobile phone, or a laptop.

14. A method of facilitating enrollment of a biometric template, the method comprising:
- coupling the enrollment device to an external user authentication token through a token interface unit, wherein the user authentication token includes a fingerprint sensor;
- providing visual information to a user through a plurality of optical output elements comprised in a user interface unit of the enrollment device, said visual information being indicative of a progress of a fingerprint biometric template enrollment in the authentication token; and
- receiving, by a user interface control unit of the enrollment device, input data indicative of said progress from the authentication token through the token interface unit and controlling the user interface unit using said input data,
- wherein the enrollment device transmits control commands to the user authentication token through the token interface unit, processes response information received from the user authentication token through the token interface unit, and provides corresponding user feedback through the user interface unit, wherein the user authentication token is configured to detect a finger touching the fingerprint sensor and to detect the finger lifting from the fingerprint sensor, and in response to the finger touch, an optical output element of the plurality of optical elements is activated to provide a positive feedback indication, and in response to a fingerprint being acquired from the finger, the optical output element is deactivated indicating that the fingerprint has been acquired and the finger may be lifted from the fingerprint sensor, thereby allowing the user of the user authentication token to control timing of fingerprint acquisition.

15. The method of claim 14, wherein the optical output elements are organized in a linear array or wherein the optical output elements are organized in a circular array.

16. The method of claim 14, wherein the optical output elements are light-emitting diodes.

17. The method of claim 14, wherein the optical output elements have different colors, said different colors being associated with different types of user feedback.

18. The method of claim 14, wherein different subsets of the optical output elements are associated with different types of user feedback.

19. The method of claim 14, wherein the method is implemented as a computer program stored in a non-transitory computer readable storage medium, the computer program comprising executable instructions which, when executed, carry out or control the method.

\* \* \* \* \*